United States Patent
Lombardi et al.

(10) Patent No.: US 6,221,921 B1
(45) Date of Patent: Apr. 24, 2001

(54) DISPERSANT SYSTEM AND PROCESS FOR FORMULATING NON-AQUEOUS SILICEOUS PARTICULATE SLURRIES

(75) Inventors: John Lang Lombardi, Tucson, AZ (US); Kevin Haines Johnston, Beverly Hills, CA (US); David Zackery Dent, Tucson, AZ (US)

(73) Assignee: Advanced Ceramics Research, Inc., Tucson, AZ (US)

( * ) Notice: Subject to any disclaimer, the term of this patent is extended or adjusted under 35 U.S.C. 154(b) by 0 days.

(21) Appl. No.: 09/417,396

(22) Filed: Oct. 14, 1999

(51) Int. Cl.[7] .............................. B01F 3/12; B01F 17/14; B01F 17/46; C04B 35/565
(52) U.S. Cl. ............................ 516/33; 516/199; 516/34; 106/287.11; 501/97.1
(58) Field of Search ................ 516/33, 34, 199; 501/97.1; 106/287.11

(56) References Cited

U.S. PATENT DOCUMENTS

| | | | |
|---|---|---|---|
| 4,640,790 | 2/1987 | Sylvester et al. | 516/33 |
| 4,645,611 | 2/1987 | Campbell et al. | 252/62.51 R |
| 4,704,165 | 11/1987 | Nakamura et al. | 106/503 |
| 4,872,916 | 10/1989 | Latosky | 106/503 |
| 4,894,194 | 1/1990 | Janney | 264/109 |
| 5,028,362 | 7/1991 | Janney et al. | 264/432 |
| 5,069,839 * | 12/1991 | Grote et al. | 501/88 |
| 5,069,931 | 12/1991 | Gerum et al. | 427/128 |
| 5,164,346 * | 11/1992 | Giunchi et al. | 501/95.2 |
| 5,273,837 | 12/1993 | Aitken et al. | 429/30 |
| 5,723,271 * | 3/1998 | Smith et al. | 430/517 |
| 5,762,737 | 6/1998 | Bloink et al. | 156/89.11 |
| 5,785,894 | 7/1998 | Schofield et al. | 516/90 |

OTHER PUBLICATIONS

*Encyclopedia of Chemical Technology*, Copyright 1979, by John Wiley & Sons, Inc., Ceramics, vol. 5 (pp. 234–259).

* cited by examiner

Primary Examiner—Richard D. Lovering
Assistant Examiner—Daniel S. Metzmaier
(74) Attorney, Agent, or Firm—Banner & Witcoff, Ltd.

(57) ABSTRACT

A dispersant system for formulating stable non-aqueous siliceous particulate slurries, comprising a vehicle comprising a liquid ester, and a dispersant comprising an alkoxylated aminoalcohol and organophosphate ester. Siliceous particulate slurries in accordance with the present invention can include slurries containing siliceous ceramic particulate (i.e., silicon nitride, silicon carbide, silica, and silicon metal powders partially oxidized by air exposure). A wide variety of linear and cyclic organic esters can be used as a vehicle component, including lactones. The alkoxylated aininoalcohol is typically an ethoxylated aminoethanol oligomer. A wide variety of aromatic and nonaromatic organophosphate ester compounds can be used for the second dispersant component.

4 Claims, 2 Drawing Sheets

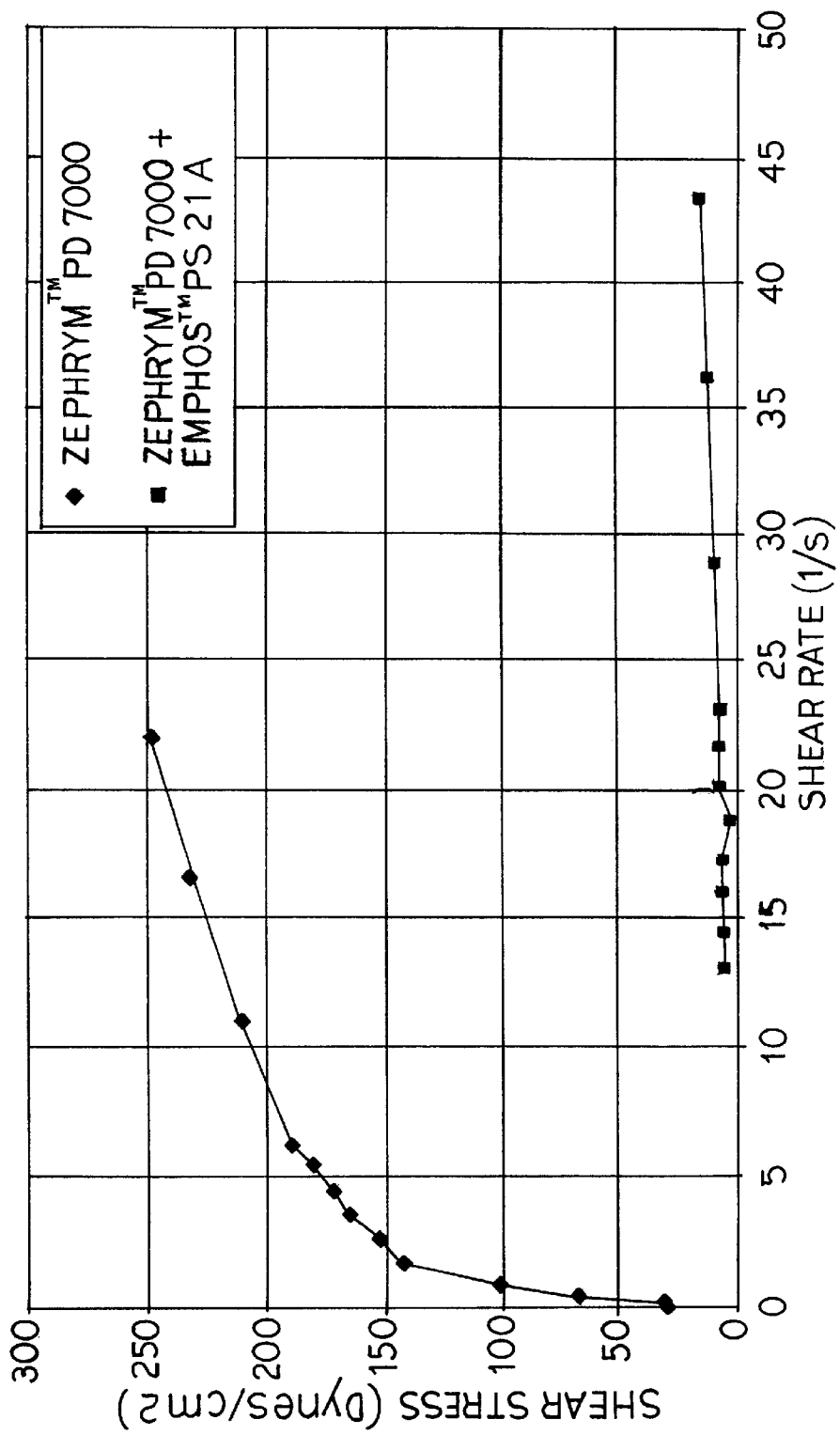

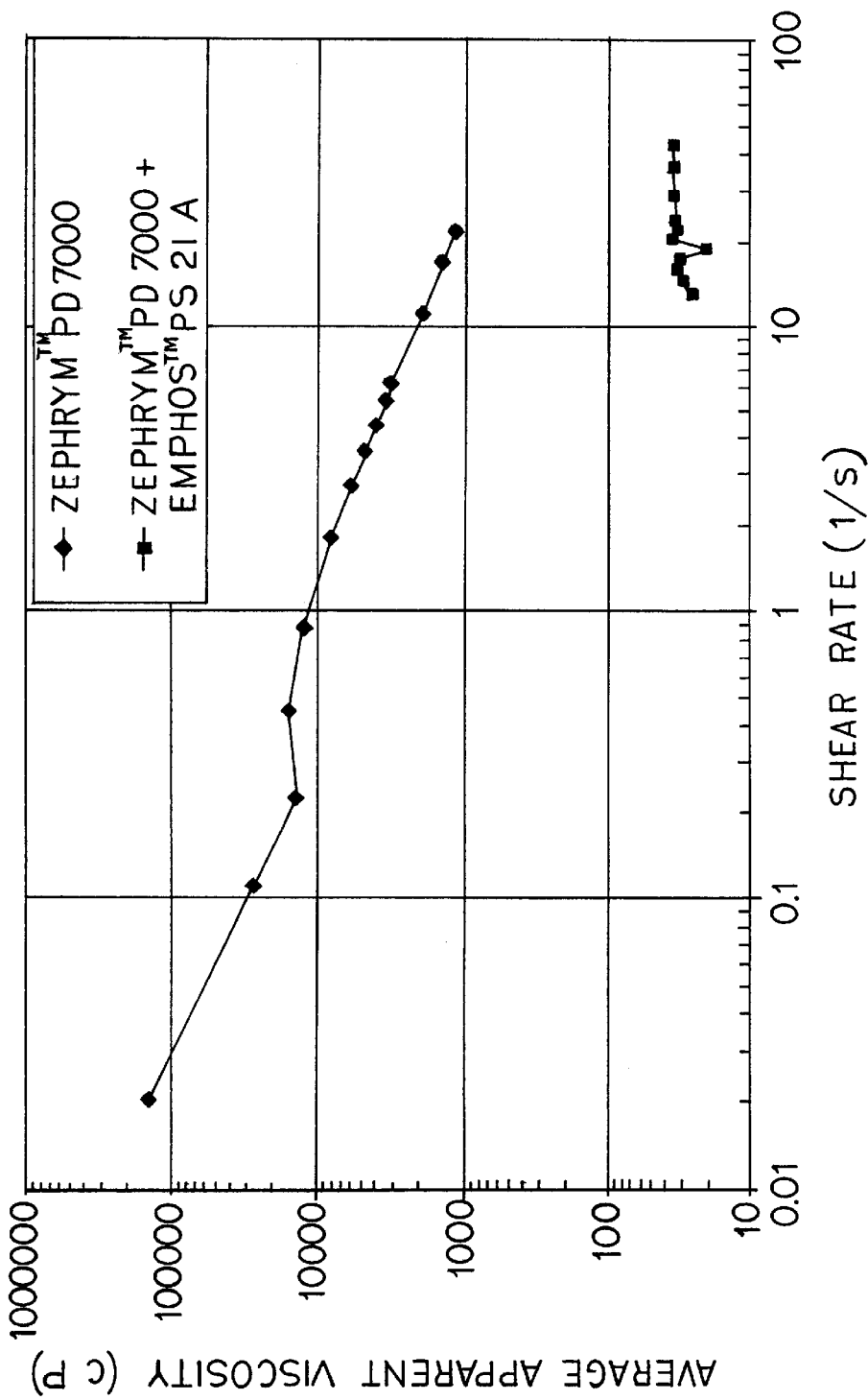

DISPERSANT SYSTEM AND PROCESS FOR FORMULATING NON-AQUEOUS SILICEOUS PARTICULATE SLURRIES

FIELD OF THE INVENTION

This invention relates to dispersant systems and methods for formulating non-aqueous siliceous particulate slurries. More particularly, the present invention relates to new ceramic slurries for use in a wide variety of green (i.e., "undried") ceramic forming processes, including slip casting and gel casting. Numerous ceramic products can be made using the present invention include, but are not limited to, turbine engine components, wear resistant tooling and other structural engineering ceramic components, as well as traditional whitewares.

BACKGROUND OF THE INVENTION

In conventional slip casting, a suspension of ceramic particles dispersed in a liquid vehicle (i.e., a "slip") is poured into a porous plaster of Paris mold. The interior surfaces of the mold conform to the exterior surface of the desired ceramic piece. As the plaster absorbs the liquid vehicle from the slip via capillary action, solid particles are deposited on the interior surface of the mold. The process may be continued until the walls of the ceramic piece meet the center, as in solid casting, or the slip may be drained from the mold when the walls reach the desired thickness, as in drain casting. Conventional slips are prepared in several ways. Slurries are typically prepared by ball milling ceramic particles. For example, filter cake may be blunged or raw materials may be ball-milled in the vehicle. A dispersant is usually added to the liquid vehicle prior to milling to keep the solid particles in suspension in the liquid vehicle. Otherwise, the particles would settle, forming thicker walls at the bottom of the mold. Furthermore, addition of a dispersant to the slurry increases its fluidity by inhibiting interparticle coalescence and flocculation. The mold can be made in two or more parts to facilitate removal of the ceramic piece.

The principal advantage of slip casting is that it permits formation of complex shapes. It is widely used throughout the ceramic industry. Another advantage of slip casting is that the molds are relatively inexpensive and they are reusable. In some cases, pieces of ware are cast separately and joined, using the slip as an adhesive (e.g., handles for whiteware cups and vases).

Gel casting differs from slip casting in that the former entails pouring a slurry into a nonporous mold which is subsequently heated to gel the slurry and form the green ceramic part. Gel casting therefore relies upon a slurry gelation mechanism for green part consolidation rather than through a capillary wicking effect encountered during slip cast molding. Gelation is typically accomplished by in-situ free radical polymerization of acrylate or vinyl monomers present as solutes within the gel casting slurry vehicle. (See e.g. U.S. Pat. Nos. 4,894,194 and 5,028,362.) The resulting polymer forms a binder phase in the gel cast green ceramic part after molding.

In order to minimize the amount of shrinkage and possible distortion of the ceramic part during drying, binder removal, and sintering operations, green ceramic parts, regardless of forming technique, should exhibit high green densities (e.g. green density should be at least 50% that of the sintered ceramic part density). This requires that ceramic slurries should have high solids loadings. Slip casting slurries typically do not require as high a solids loading compared to those used for gel casting for the reason that the porous molds used in the former continually remove the liquid vehicle from the slurry during casting and raises green ceramic part density. Gel casting slurries, on the other hand, require at least 50 volume % solids since no liquid vehicle is removed during casting and gelation.

In order to achieve a high ceramic solids loading and maintain slurry fluidity, a dispersant is often added to the gel casting formulation. The dispersant is a low molecular weight polymer or oligomer which has a polar end group having a strong affinity for the ceramic particulate surface while the tail end of the molecule becomes solvated within the vehicle. Suitable dispersants have tail ends that are highly solvated within the vehicle liquid. These dispersants form a steric barrier toward ceramic interparticle coalescence and ultimately slurry flocculation. In essence, the attractive force between the vehicle molecules and the dispersant tail overrides the interchain attractive effects present within the dispersant molecule.

Numerous slurries containing siliceous ceramic particulate (i.e., silicon nitride, silicon carbide, silica, and silicon metal powder partially oxidized by air exposure) have been formulated in aqueous vehicles previously. Unfortunately, most of these slurries suffer from the drawback that water present in its vehicle causes hydrolytic degradation of the particulate surfaces and forms soluble ionic silicate species within the vehicle. A number of variables magnify this problematic hydrolysis effect including, allowing the slurry to stand for prolonged time periods and exposure to elevated temperatures, or formulating the slurry under alkaline pH conditions.

Slurry particle hydrolysis is undesirable for several reasons. First, the formation of soluble silicate hydrolysis by-products often changes slurry rheology by increasing its viscosity when subjected to low shear (as encountered when pouring the slurry). This is undesirable since many green ceramic forming methods rely upon slurries that have predictable and controllable viscosities that do not change upon aging. Second, the soluble silicates may polymerize and induce slurry gelation. Further, particulate hydrolysis may change the overall slurry chemical composition by increasing the amount of oxygen (in the form of silica) within the ceramic formulation. This is particularly undesirable for silicon carbide (SiC) and silicon nitride ($Si_3N_4$) slurries since the properties of sintered ceramics made from these materials are highly sensitive to small changes in chemical composition. An increased amount of silica in an ages SiC and $Si_3N_4$ slurry may manifest itself as a change in the composition and properties of the intergranular glass phase responsible for binding the individual SiC or $Si_3N_4$ grains together within the sintered ceramic body. Elevated silica levels in intergranular glasses, for example, have been shown to decrease the high temperature creep resistance of sintered $Si_3N_4$ ceramics.

Consequently, there is a significant need for methods and formulations for siliceous ceramic slurries that do not have the disadvantages of conventional methods and formulations.

SUMMARY OF THE INVENTION

The present invention overcomes the problems encountered in conventional methods and formulations by providing a non-aqueous vehicle that does not undergo significant changes in rheology compared to conventional formulations.

More specifically, the present invention provides methods and formulations that use a vehicle and dispersant composition as well as a formulating process for preparing stable, non-aqueous slurries containing a high siliceous ceramic solids composition (greater than 25 volume percent, and preferably, greater than 50 volume percent solids). Siliceous ceramic particles that can be dispersed in the vehicles of the present invention include oxidized silicon metal, and more preferably silicon nitride or silicon carbide.

The slurry formulation of the present invention comprises an organic liquid ester that serves as the major component of the vehicle, and a mixture of alkoxylated aminoalcohol (alkanolamine) and organophosphate ester, which collectively constitute the dispersant. A wide variety of linear and cyclic organic esters can be used as a vehicle component, with lactones (e.g., gamma-butyrolactone, referred hereafter as "BLO") being a preferred ester. The alkoxylated aminoalcohol is typically an ethoxylated aminoethanol oligomer (sold under the tradename of HYPERMER™ PS-2 or ZEPHRYM™ PD-7000, made by I.C.I. Specialty Chemicals of Wilmington, Del.). A wide variety of aromatic and nonaromatic organophosphate ester compounds can be used for the second dispersant component including materials sold under the trade names of EMPHOS™ PS-21A and a series of MAPHOS™ products #8135, JP 70, and 60A.

DETAILED DESCRIPTION OF THE DRAWINGS

FIG. 1 is graph illustrating the effect of dispersant type on shear rate-shear stress relationship for non-aqueous $Si_3N_4$ slurries.

FIG. 2 is graph illustrating the effect of dispersant type on shear rate-viscosity relationship for non-aqueous $Si_3N_4$ slurries.

DETAILED DESCRIPTION OF THE PREFERRED EMBODIMENTS

As noted above, the present invention provides methods and formulations that use a vehicle and dispersant composition as well as a formulating process for preparing stable, non-aqueous slurries containing a high siliceous ceramic solids composition (greater than 25 volume percent, and preferably, greater than 50 volume percent solids). Siliceous ceramic particles that can be dispersed in the vehicles of the present invention include oxidized silicon metal, and more preferably silicon nitride or silicon carbide.

The slurry formulation of the present invention comprises an organic liquid ester that serves as the major component of the vehicle, and a mixture of alkoxylated aminoalcohol (alkanolamine) and organophosphate ester, which collectively constitute the dispersant A wide variety of linear and cyclic organic esters can be used as a vehicle component, with lactones (e.g., gamma-butyrolactone, referred hereafter as "BLO") being a preferred ester. The alkoxylated aminoalcohol is typically an ethoxylated aminoethanol oligomer, such as the oligomer sold under the tradename of HYPERMER™ PS-2 or ZEPHRYM™ PD-7000 (both manufactured by I.C.I. Specialty Chemicals of Wilmington, Del.). A wide variety of aromatic and nonaromatic organophosphate ester compounds can be used for the second dispersant component including materials sold under the trade names of EMPHOS™ PS-21A (made by Witco Corporation) and a series of MAPHOS™ products #8135, JP 70, and 60 A (made BASF Corporation of Folcroft, Pa.).

To demonstrate the utility of the dispersants, silicon nitride slurries were formulated in an ester vehicle composed of BLO and 1,6,-hexanedioldiacrylate (HODA). UBE E-10 grade silicon nitride (see Table I below for powder specifications) was slowly mixed into a BLO/HODA ester vehicle with the simultaneous addition of ZEPHRYM™ PD-7000. Silicon nitride powder was continually mixed into the slurry until it became paste like. The exact composition of the paste like slurry is presented in Table II below. The batch was then separated into two equal volumes. A few drops of EMPHOS PS-21A organophosphate ester dispersant was then mixed into one of the volumes which dramatically changed its appearance to a highly fluid, easily pourable liquid. (Table III depicts the composition of the slurry containing the phosphate ester addition.)

The results from viscosity measurements performed upon the control as well as the organophosphate ester treated slurries are presented in FIGS. 1 and 2. Slurry viscosities were measured using a BROOKFIELD™ DV-III Rheometer (Brookfield Instruments of Middleboro, Mass.). As can be seen from the figures, the addition of small amounts of phosphate ester greatly reduced the slurry viscosity by a factor of approximately fifty fold. Organophosphate ester and the alkoxylated aminoalcohol can be suitably used as a dispersant for silicon nitride within an ester type vehicle. Attempts to repeat the above experiment by varying the order of addition of the two dispersant components (i.e., adding the phosphate ester before the ethoxylated aminoalcohol or premixing the requisite amounts of the two components prior to addition to the slurry) had no beneficial change upon slurry viscosity, compared to the formerly described procedure.

It is therefore believed that successful slurry preparation requires both the appropriate composition as well as the proper order of component addition during formulation. Highly fluid, pourable slurries composed of >50 volume percent solids have been successfully formulated using the above components and mixing procedure. (Table IV lists a slurry having 50 volume percent solids composition which was initially mixed and later ball milled for 48 hours). The above formulation and method also appears to be usable for preparing slurries composed of various grades of silicon nitride powders having surface oxygen contents ranging from 0.9 to 1.4 percent.

Similar success has also been obtained in formulating high solids silicon metal slurries using the above technique (as depicted in Table V below).

TABLE I

Specifications of As Received Siliceous Slurry Raw Materials

| Material | Manufacturer | Particle Size (μm) | Surface Area (sq. m/g) | Surface Oxygen Content (%) |
| --- | --- | --- | --- | --- |
| M11 ™ $Si_3N_4$ | H. C. Starck, GmbH & Company, Newton, MA | 0.7 | 10 | 1.4 |
| Baysinid ™ PK 9120 ST $Si_3N_4$ | Bayer Corporation, Pittsburgh, PA | 0.5 | 10.0 | 1.4 |
| E-05 ™ $Si_3N_4$ | Ube Industries, Tokyo, Japan | 0.7 | 5.0 | 0.94 |
| E-10 ™ $Si_3N_4$ | Ube Industries, Tokyo, Japan | 0.4 | 10.0 | 1.22 |
| Si Metal | Fluka AG Buchs, Switzerland | | | |

TABLE II

Silicon Nitride Paste Composition

| Material | Amount (Weight Percent) |
|---|---|
| UBE ™ 3-10 $Si_3N_4$ | 53.19 |
| BLO | 34.13 |
| HODA | 12.15 |
| ZEPHRYM ™ PD-7000 | 0.53 |

*Slurry was 26.44 volume percent solids

TABLE III

Fluid Slurry Composition after Phosphate Ester Addition

| Material | Amount (Weight Percent) |
|---|---|
| UBE ™ E-10 $Si_3N_4$ | 53.15 |
| BLO | 34.11 |
| HODA | 12.14 |
| ZEPHRYM ™ PD-7000 | 0.53 |
| EMPHOS ™ PS-21A | 0.07 |

*Slurry was 26.41 volume percent solids

TABLE IV

Typical High Solids (50.8 volume percent) Silicon Nitride Slurry

| Material | Manufacturer | Manufacturer Location | Weight Percent |
|---|---|---|---|
| UBE ™ E-05 | Ube Industries | Tokyo, Japan | 24.09% |
| UBE ™ E-10 | Ube Industries | Tokyo, Japan | 34.09% |
| MOLYCORP ™ Y23 | Molycorp, Inc. | Mountain Pass, California | 6.97% |
| MALAKOFF ™ AI203 | Malakoff Industries, Inc. | Malakoff, Texas | 2.32% |
| BLO | Adrich Chemical Company, Inc. | Milwaukee, Wisconsin | 11.12% |
| HODA | Adrich Chemical Company, Inc. | Milwaukee, Wisconsin | 8.79% |
| ZEPHRYM ™ MPD-7000 | ICI Specialty Chemicals | Wilmington, Delaware | 1.81% |
| MAPHOS ™ 8135 | BASF Corporation | Folcroft, Pennsylvania | 0.81% |

TABLE V

Typical High Solids (61.1 volume percent) Silicon Metal Slurry

| Component | Weight Percent |
|---|---|
| Silicon Metal | 77.40% |
| BLO | 11.90% |
| HODA | 9.40% |
| ZEPHRYM ™ PD-7000 | 0.94% |
| MAPHOS ™ 8135 | 0.35% |

Slurry Ingredient Manufacturers

| Material | Manufacturer | Manufacturer Location |
|---|---|---|
| STARCK ™ $Si_3N_4$ | H. C. Starck, GmbH & Company | Newton, Massachusetts |
| Baysinid ™ PK 9120 ST | Bayer | Pittsburgh, Pennsylvania/ Leverkusen, Germany |
| UBE ™ E-05 | Ube Industries | Tokyo, Japan |
| UBE ™ E-10 | Ube Industries | Tokyo, Japan |
| MOLYCORP ™ Y23 5600 | Molycorp, Inc. | Mountain Pass, California |
| MALAKOFF ™ AI203 | Malakoff Industries, Inc. | Malakoff, Texas |
| Silicon Metal | Fluka, AG | Buchs, Switzerland |
| BLO | Adrich Chemical Company, Inc. | Milwaukee, Wisconsin |
| HODA | Adrich Chemical Company, Inc. | Milwaukee, Wisconsin |
| EMPHOS ™ PS-21A | Witco Corporation | Greenwich, Connecticut |
| ZEPHRYM ™ PD-7000 | ICI Specialty Chemicals | Wilmington, Delaware |
| MAPHOS ™ 8135 | BASF Corporation | Folcroft, Pennsylvania |
| MAPHOS ™ JP 70 | BASF Corporation | Folcroft, Pennsylvania |
| MAPHOS ™ 60 A | BASF Corporation | Folcroft, Pennsylvania |
| Santicizer ™ 141 | Solutia | St. Louis, Missouri |
| Santicizer ™ 148 | Solutia | St. Louis, Missouri |

Those of skill in the art will recognize various changes to the methods, materials, component ratios, and apparatus are possible without departing from the spirit and scope of the invention. Thus, the invention is to be limited only by the claims and equivalents thereof.

What is claimed is:

1. A dispersant system for formulating a stable non-aqueous siliceous particulate slurry, comprising:

a vehicle comprising a liquid ester, and a dispersant comprising an alkoxylated aminoalcohol and organophosphate ester, wherein the liquid ester is a lactone; and wherein the alkoxylated aminoalcohol is mixed with the vehicle and mixed with the slurry prior to addition of organophosphate ester.

2. The dispersant system of claim 1, wherein the lactone is gamma-butyrolactone.

3. A dispersant system for formulating a stable non-aqueous siliceous particulate slurry, comprising:

a vehicle comprising 1,6 hexanedioldiacrylate, and a dispersant comprising an alkoxylated aminoalcohol and organophosphate ester;

wherein the alkoxylated aminoalcohol is mixed with the vehicle and mixed with the slurry prior to addition of organophosphate ester.

4. A stable non-aqueous siliceous particulate slurry, comprising:

a silicon nitride, and a dispersant vehicle comprising a liquid ester, a dispersant comprising an alkoxylated aminoalcohol and organophosphate ester wherein the alkoxylated aminoalcohol is mixed with the vehicle and mixed with the silicon nitride prior to addition of organophosphate ester, wherein the alkoxylated aminoalcohol and organophosphate ester is present in a sufficient amount that the viscosity of the slurry is reduced below the slurry viscosity prior to the addition of said dispersants.

* * * * *